United States Patent Office 3,258,504
Patented June 28, 1966

3,258,504
PYROLYTIC PREPARATION OF DI-p-XYLYLENE
René Lenaers and Bartholomew Hargitay, Brussels, Belgium, assignors to Union Carbide Corporation, a corporation of New York
No Drawing. Filed Aug. 4, 1965, Ser. No. 481,441
22 Claims. (Cl. 260—668)

This application is a continuation-in-part of copending application Serial No. 260,295, filed February 21, 1963 and now abandoned.

This invention relates to the preparation of di-p-xylylene. More particularly, this invention relates to the pyrolysis of p-xylene under improved reaction conditions whereby di-p-xylylene can be produced with increased efficiency and yield.

Cyclic di-p-xylylene having the structure

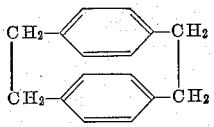

was first isolated as a by-product in the preparation of poly-p-xylylene by the pyrolysis of p-xylene as described by Brown et al., Nature, 164, 915 (1949). The di-p-xylylene, however, was found only in trace amounts in the polymer. The cyclic dimer has also been prepared through a Wurtz reaction of p-xylylene dibromide and sodium as described by Cram et al., J. Am. Chem. Soc., 93, 5691 (1951). The very low yields and efficiencies obtained with these processes has been attributed to the abnormal molecular configuration of di-p-xylylene. The proximity of the aromatic rings gives rise to electronic interaction between the pi-electrons of the two rings. Moreover, the aromatic nuclei are distorted from their normal planar configurations giving rise to a strained and sterically hindered molecule. It has also been found that the pyrolysis of di-p-xylylene results in a linear polymer as opposed to the cross-linked polymer obtainable by the direction pyrolysis of p-xylene. Thus, it has become increasingly important to find a suitable method for producing the cyclic dimer, di-p-xylylene, in yields and efficiencies sufficient for commercial production.

Accordingly, it is an object of the present invention to provide an improved process for the preparation of di-p-xylylene.

It is another object to provide a method for obtaining di-p-xylylene in good yields and efficiencies.

It is still another object to provide a means for the suppression of polymer formation upon condensation thereby increasing the efficiency and yield of the cyclic dimer.

These and other objects are accomplished in accordance with the present invention by generating the reactive xylylene diradical

by the pyrolysis of p-xylene at elevated temperatures, maintaining the reactive diradicals in the vaporous state for a prolonged period of time, passing the vapors containing the diradicals through an adsorption medium maintained at temperatures above the condensation temperature of the diradicals, and thereafter condensing the vapors to isolate the cyclic dimer.

The reactive diradical, p-xylylene is generated, in this process, by pyrolysis of a vaporized p-xylene at temperatures of from about 800° C. to about 1100° C. and preferably between about 950° C. and about 1050° C. At temperatures above about 1100° C. excessive decomposition of the feed is occasioned which undesirably affects the resultant yield of product.

Pyrolysis temperature is essentially independent of the operating pressure. It is however preferred that reduced or subatmospheric pressures be employed. The pyrolysis reaction is conducted in a pyrolyzation chamber maintained at pressures within the range of 0.0001 to 100 mm. Hg, with optimum conditions generally being secured at pressures between about 1 to 10 mm. Hg. However, if desired, greater pressures can be employed. Likewise, if desirable, inert vaporous diluents such as nitrogen, argon, carbon dioxide, steam and the like can be employed to vary the optimum temperature of operation or to change the total effective pressure in the system.

It has been found in the present invention that while it is possible to operate without a catalyst, the presence of a catalyst in the pyrolyzation chamber facilitates the cleavage of a hydrogen atom from the alpha carbon of the p-xylene employed. More particularly, hydrogenation catalysts such as the Houdry platinum catalyst, activated alumina, and the like are preferred. Apparently, catalytic contact helps to combine hydrogen atoms into hydrogen molecules which are stable at the temperatures employed. Such action greatly reduces the reversal of the xylene→xylyl free radical+hydrogen-atom reaction and could easily account for the increase in pyrolysis efficiency. Through disproportionation, the xylyl free radical yields the p-xylylene diradical which according to the process herein described forms the cyclic dimer, di-p-xylylene. Thus it becomes evident that the non-reversible nature of the initial hydrogen cleavage reaction accomplished through use of a hydrogenation catalyst is an important factor in increasing the yield and efficiency in the cyclic dimer process. The catalyst is placed within and can almost completely fill the pyrolyzation zone. The catalyst can easily be kept in place by employing funnel shaped tubes, iron mesh, or similar restraining devices.

The p-xylylene diradicals formed in the pyrolysis reaction have been found to be remarkably stable in the gas phase but readily undergo polymerization to poly-p-xylylene if condensed. Therefore premature condensation must be carefully avoided in dimer formation.

The reaction between two p-xylylene diradicals has been found to be the rate determining step in the formation of the cyclic dimer. The rate of this reaction increases with increasing temperature; however, the reaction equilibrium favors decomposition of the cyclic dimer into p-xylylene diradicals as the temperature increases, with the result that only at temperatures below about 450° C. has the cyclic dimer been found to form in any appreciable yield. Thus, in the present invention, the dimerization reaction is conducted at temperatures between about 175° C. and about 450° C. At temperatures below about 175° C., the reaction rate is too slow to be considered commercially feasible; moreover, there is danger of premature condensation leading to polymerization of the diradicals to polymer. At temperatures above about 450° C., the equilibrium favors formation of diradicals with the result that substantially no cyclic dimer is formed. Most preferably, the reaction is conducted at temperatures between about 200° C. and about 400° C.

It has also been found in the present invention, that cyclic dimer formation can be substantially increased by prolonging the residence time of the p-xylylene diradicals in the gaseous state thereby increasing the probability of collisions between the diradical species. This can be conveniently accomplished by interposing a gas phase reactor between the pyrolysis zone and the condensation zone employed in cyclic dimer production.

The gas phase reactor is essentially an empty continuous-walled chamber, in which the pyrolysis gases are maintained in the vaporous state for a prolonged period of time at the conditions maintained within the reactor in order to allow the xylylene diradicals to collide and react in the gas phase. While the gas phase reaction period is preferably as long as commercially feasible, about 0.1 to about 30 seconds has been found sufficient although a greater or lesser duration can be suitably employed. The temperature within the gas reactor is maintained above the condensation temperature of the diradicals and below that temperature above which di-p-xylylene dissociation begins, i.e., about 450° C. Thus, temperatures between about 175° C. and 450° C. are maintained within the gas reactor. More preferably, temperatures between about 200° C. and about 400° C. have been found advantageous. Moreover, it has been found that increasing the pressure within the gas reactor enhances the collision probability and thereby increases dimer production efficiency. This can be conveniently accomplished by situating a compressor intermediate the pyrolysis zone and the gas reactor, said compressor being capable of compressing the pyrolyzed gases up to several atmospheres. It has been found preferable to increase the gas pressure up to several atmospheres but not above the saturated vapor pressure of the diradicals, although a greater or lesser pressure could be suitably employed. Although the increased pressure within the reactor is not considered essential, it has been found both theoretically and practically to enhance the efficiency of cyclic dimer formation.

It has been also found that a further increase in di-p-xylylene formation could be obtained accompanied by a surprisingly complete suppression of polymer formation by passage of the pyrolysis vapors upon their efflux from the gas phase reactor through a hot adsorption bed. By the term "hot adsorption bed" as used herein and in the appended claims is meant a bed consisting of a high surface area adsorbent media maintained at temperatures above the condensation temperature of the reactive diradicals. The marked increase in yield of di-p-xylylene is apparently due to the creation of a high concentration of p-xylylene diradicals on the adsorbent surfaces which, in effect, increases the collision probability thus serving essentially as another increase in contact time. The xylylene diradicals which previously had gone into polymer formation are apparently diverted in their reaction course to yield di-p-xylylene with the consequent nearly complete suppression of polymer formation.

The hot adsorption bed is basically comprised of a chamber having a porous bed therein which supports a layer of adsorption media. Adsorption media which have been found applicable are those providing a high surface area to volume ratio such as silica gels, molecular sieves, aluminas, powdered Houdry platinum, and the like. The thickness of the adsorption layer can suitably range from 2 to 8 cm. although a greater or lesser depth could also be employed without departing from the scope of the present invention. It is considered important that the temperature of the hot adsorption bed be maintained above the condensation temperature of the reactive diradicals yet below the temperature below which di-p-xylylene formation begins, i.e., about 450° C. Thus the temperature within the hot adsorption bed is maintained between about 175° C. and about 450° C. and more preferably between about 200° C. to 400° C. For the same reasons hereinabove discussed in relation to the gas reactor, it has been found advantageous to increase the pressure within the hot adsorption bed. Thus, it is preferred that the pressure within the hot adsorption bed correspond to that in the gas reactor. The compression of the pyrolysis gases prior to their entrance into the gas reactor is considered sufficient for this purpose.

While the use of either the gas phase reactor or the hot adsorption bed promotes a noticeable improvement in di-p-xylylene formation, it is quite surprising to find that their combined presence in the manner hereinabove described provides a synergistic effect on both the yield and efficiency of di-p-xylylene formation accompanied by a nearly complete suppression of poly(p-xylylene) formation.

Upon leaving the hot adsorption bed, the pyrolyzed gases are cooled in a water or air cooled condenser to temperatures at or below the condensation temperature of the di-p-xylylene. Temperatures below about 150° C. are sufficiently low to crystallize out the cyclic dimer and all other solid products having a relatively low vapor pressure. By maintaining reduced pressures in the condensation zone, however, the other volatile by-products such as p-xylene, toluene or inert gases such as those which could be used as diluents in the pyrolysis are not condensed within the specified temperature zone but instead can be subsequently recovered in later cold traps. The cooling of the pyrolysate vapors may also be accomplished in any of several convenient means. For instance, internal or external condensers, cooling coils, or long runs of air cooled tubing. It is also possible to condense the pyrolysate vapors by admixture with an organic solvent condensing medium either by bubbling the vapors through a liquid organic condensing medium or by mixing the pyrolysate vapors with the organic condensing media in the vapor state. Such inert organic solvents as p-xylene, toluene, benzene, o-dichlorobenzene, acetic acid, mineral oil, heptane, and the like are preferred.

The following examples are illustrative of the invention but are not intended to serve as any limitation or restriction thereof. Unless otherwise specified, all percentages and parts are by weight.

The examples summarized in the tables below were all run in the general manner hereinafter described.

A feed pump is connected by a capillary to the bottom of a mercury filled glass column. Liquid p-xylene is injected into the bottom of the column and is allowed to rise through the column and vaporize in a heated bulb located at the top of the column. The p-xylene vapors enter a pyrolyzer consisting of a 400 mm. quartz tube having an inside diameter of 25 mm. and which is maintained at temperatures between about 900° C. to 1100° C. by a tubular resistor-wire furnace. The pyrolysis tube is equipped with a thermocouple and filled with a hydrogenation catalyst, preferably a Houdry platinum catalyst, to aid in the cleavage of a hydrogen atom from an alpha carbon of p-xylene. The pressures of the gases leaving the pyrolyzer can be advantageously increased to at least several hundred millimeters by passage through a compressor maintained at temperatures above the condensation temperature of di-p-xylylene, i.e., above about 200° C. and situated immediately after the pyrolyzer. The gases leaving the pyrolysis tube are never allowed to cool under 175° C. until they are subsequently condensed. All connections, tubing, et cetera between the parts of the apparatus are heated either by heating tapes or small furnaces in order to keep the temperature above the condensation temperature of the cyclic dimer. The pyrolyzed gases thereafter enter a gas reactor, essentially an empty heated cylinder, in which the passage of the diradicals is prolonged for a sufficient period to allow inter-action in the gas phase. The gas reactor is built of high temperature glass and surrounded by a furnace maintained at temperatures above 200° C. Subsequent to the long residence time in the gas reactor, the vapors containing the diradicals are passed into the hot adsorption bed which is comprised of a sintered glass filtration funnel having a diameter of 9 cm. and containing a layer of about 2 to 10 cm. of adsorption media as heretofore described on the filter plate. The hot adsorption bed is maintained by a suitable furnace at temperatures above about 200° C. Upon passage through the hot adsorption bed, the vapors containing the diradicals are led through a series of condensers wherein the vapors condense to form di-p-xylylenes. The first condenser is a conventional glass condenser with tap water cooling (10° C. to 20° C.). The temperature is low enough to allow the di-p-xylylene to crystallize. By applying reduced pressure, p-xylene and other volatile by-products are not condensed in this temperature range. A dry ice condenser following the first condenser recovers the unreacted p-xylene. For a better separation of products, a condenser maintaining temperatures of about 50° C. preceding the initial condenser allows crystallization of di-p-xylylene of 90 percent purity. The products condensed in the first condenser are extracted with chloroform on a water bath. All products except poly(p-xylylene) dissolve in chloroform. After concentrating the chloroform solution to about 20 ml., about 50 ml. of ethyl acetate are added and the mixture is gently boiled to a final volume of about 20 ml. The concentrate is cooled to about −10° C. where crystals of nearly pure di-p-xylylene deposit. The crystals are washed with ethyl acetate and dried at 100° C. Melting point of the di-p-xylylene obtained is 285° C. The bulk of the material crystallized in the second condenser is p-xylene.

The following examples illustrate the use of the gas reactor without the hot adsorption bed (Group I); the hot adsorption bed without the precedent gas reactor (Group II); and the preferred embodiment employing both the gas reactor and the hot adsorption bed illustrating the synergistically increased efficiency obtained and the suppression of polymer formation (Group III).

6. Process as defined in claim 5 wherein the inert vaporous diluent is steam.

7. Process as defined in claim 1 wherein the vapors are condensed by admixing said vapors with an inert organic solvent condensing medium.

8. Process for the preparation of di-p-xylylene which comprises generating the reactive diradical

by the pyrolysis of p-xylene at temperatures between about 800° C. and about 1100° C., maintaining the reactive diradicals in the vaporous state at a temperature between about 175° C. and about 450° C. for a period of time sufficient to allow interaction of said diradicals passing the vapors through a hot adsorption bed maintained at temperatures above the condensation temperature of the vapors, and thereafter condensing the vapors to isolate the cyclic dimer, di-p-xylylene.

9. Process for the preparation of di-p-xylylene which comprises generating the reactive diradical

by the pyrolysis of p-xylene at temperatures between about 800° C. and about 1100° C., maintaining the vapors containing the diradicals at temperatures between

GROUP I

| | Feed Rate (grams p-xylene/hr.) | Pressure (mm. Hg) | | Temperature ° C. | | | Hot Adsorption Bed | | Percent p-xylene reclaimed | Percent poly(p-xylylene) | Di-p-xylylene | |
|---|---|---|---|---|---|---|---|---|---|---|---|---|
| | | Feed | Exhaust | Pyrolysis tube | Gas Reactor | Hot Adsorption bed | Nature | Thickness (cm.) | | | Percent Yield | Percent Efficiency |
| Group I | 15.8 | | 1.5 | ¹1,000 | 200 | | None | | 87.8 | 5.4 | 1.7 | 14.0 |
| | 15.6 | | 1.5 | ¹1,000 | 200 | | do | | 82.4 | 4.5 | 2.3 | 13.0 |

GROUP II

| | | | | | | | | | | | | |
|---|---|---|---|---|---|---|---|---|---|---|---|---|
| Group II | 12.5 | 9 | 1.5 | ²1,000 | | 200 | SiO₂ | 4 | 74.8 | 0 | 2.45 | 9.78 |
| | 15.0 | 7 | 1.0 | ²1,000 | | 200 | SiO₂ | 4 | 79.8 | 0 | 2.4 | 11.9 |

GROUP III

| | | | | | | | | | | | | |
|---|---|---|---|---|---|---|---|---|---|---|---|---|
| Group III | 19.5 | 9 | 1.0 | ²1,000 | 230 | 200 | SiO₂ | 4 | 78.0 | 0 | 5.55 | 25.3 |
| | 13.3 | 6.0 | 2.0 | ²1,000 | 230 | 200 | Molecular Sieve | 8 | 75.8 | 0.2 | 5.4 | 22.4 |
| | 69 | 12 | 2.5 | ²1,035 | 230 | 200 | do | 4 | 73.7 | 0 | 4.75 | 18.1 |
| | 14.0 | 13 | 2 | ²1,035 | 230 | 200 | Al₂O₃ | 2 | 74.0 | 0 | 6.6 | 25.4 |
| | 40.0 | 13.5 | 1.5 | ²1,030 | 200 | 275 | Al₂O₃ | 2 | 81.6 | 0 | 4.96 | 27.0 |

¹ Pyrolysis catalyst = Platforming Catalyst.
² Pyrolysis catalyst = Houdry platinum catalyst.

What is claimed is:

1. Process for the preparation of di-p-xylylene which comprises generating the reactive diradical

by the pyrolysis of p-xylene at temperatures between about 800° C. and about 1100° C., maintaining the reactive diradicals in the vaporous state at a temperature between about 175° C. and about 450° C. for a period of time sufficient to allow interaction of said diradicals, and thereafter condensing the vapors to isolate the cyclic dimer, di-p-xylylene.

2. Process as defined in claim 1 wherein the pyrolysis occurs at temperatures between about 950° C. and about 1050° C.

3. Process as defined in claim 1 wherein the pyrolysis is conducted at pressures between about 0.1 and 100 mm. Hg.

4. Process as defined in claim 3 wherein the pressure is maintained between about 1 to 10 mm. Hg.

5. Process as defined in claim 1 wherein the p-xylene is pyrolyzed in admixture with an inert vaporous diluent.

about 175° C. and about 450° C. for from about 0.1 to about 30 seconds, passing said vapors through a hot adsorption bed comprised of a high surface area adsorbent media maintained at temperatures between about 175° C. and about 450° C., and thereafter condensing the vapors to obtain the cyclic dimer di-p-xylylene.

10. Process as defined in claim 9 wherein the pyrolysis gases, upon efflux from the pyrolyzation chamber but prior to condensation, are maintained at temperatures between about 200° C. and about 400° C.

11. Process for the preparation of di-p-xylylene which comprises generating the reactive diradical

by the pyrolysis of p-xylene in an hydrogenation catalyst-filled pyrolyzation zone at temperatures between about 800° C. and about 1100° C., maintaining the reactive diradicals in the vaporous state at temperatures between about 175° C. and about 450° C. for from about 0.1 to about 30 seconds, passing the vapors through a hot adsorption bed maintained at temperatures between about 175° C. and about 400° C. and thereafter condensing the vapors to isolate the cyclic dimer, di-p-xylylene.

12. In a process for the preparation of di-p-xylylene which includes the steps of generating the reactive diradical

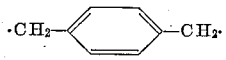

by the pyrolysis of p-xylene and thereafter condensing the vapors to obtain the cyclic dimer, di-p-xylylene, the improvement which comprises pyrolyzing the p-xylene in a pyrolysis zone containing an hydrogenation catalyst therein to prevent recombination of the free radicals and hydrogen atoms formed in the pyrolysis.

13. In a process for the preparation of di-p-xylylene which includes the steps of generating the reactive diradical

by the pyrolysis of p-xylene and thereafter condensing the vapors to obtain the cyclic dimer, di-p-xylylene, the improvement which comprises prolonging the residence time of the p-xylylene diradicals by passage through a gas phase reaction zone prior to condensation of the vapors to increase the collision probability of the diradicals and thereby increase the yield and efficiency of the di-p-xylylene.

14. Process as defined in claim 13 wherein the residence time is increased about 0.1 to about 30 seconds.

15. Process as defined in claim 13 wherein the gas phase reaction zone is maintained at temperatures between about 175° C. and about 450° C.

16. In a process for the preparation of di-p-xylylene which includes the steps of generating the reactive diradical

by the pyrolysis of p-xylene and thereafter condensing the vapors to obtain the cyclic dimer, di-p-xylylene, the improvement which comprises passing the pyrolysis vapors, prior to condensation, through a hot adsorption bed to suppress polymer formation and increase the efficiency and yield of di-p-xylylene.

17. Process as defined in claim 16 wherein the hot adsorption bed is comprised of a high surface area adsorbent media maintained at temperatures between about 175° C. and about 450° C.

18. Process as defined in claim 16 wherein the high surface area adsorbent media is silica gel.

19. Process as defined in claim 16 wherein the high surface area adsorbent media is a molecular sieve.

20. Process as defined in claim 16 wherein the high surface area adsorbent media is alumina.

21. Process as defined in claim 16 wherein the high surface area adsorbent media is powdered platinum catalyst.

22. In a process for the preparation of di-p-xylylene which includes the steps of generating the reactive diradical

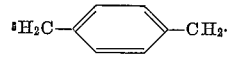

by the pyrolysis of p-xylene and thereafter condensing the vapors to obtain the cyclic dimer, di-p-xylylene, the improvement which comprises prolonging the residence time of the vapors at temperatures between about 175° C. and about 450° C. for about 0.1 to about 30 seconds by passage through a gas phase reaction zone immediately subsequent to the generation of said reactive diradicals, and thereafter passing the vapors, prior to condensation, through a hot adsorption bed at temperatures between about 175° C. and about 450° C. to suppress polymer formation and increase the efficiency and yield of di-p-xylylene.

References Cited by the Examiner

UNITED STATES PATENTS

| 2,777,005 | 1/1957 | Errede et al. | 260—2 |
| 3,117,168 | 1/1964 | Gorham | 260—668 |

FOREIGN PATENTS 883,939 12/1961 Great Britain.

DELBERT E. GANTZ, *Primary Examiner.*

C. R. DAVIS, *Assistant Examiner.*